Aug. 19, 1952     N. H. SIMPSON ET AL     2,607,709
PRESSURE-HEAT SENSITIVE BONDING MATERIAL
Filed March 21, 1950
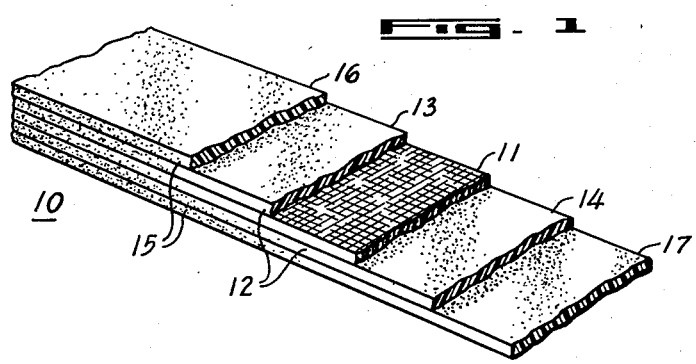
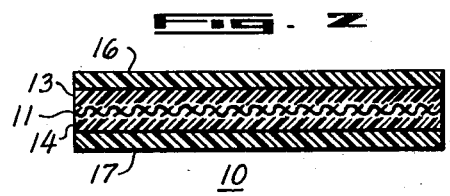
INVENTORS
Norman H. Simpson
BY & William D. Smith
ATTORNEY Patented Aug. 19, 1952

2,607,709

UNITED STATES PATENT OFFICE 2,607,709

PRESSURE-HEAT SENSITIVE BONDING MATERIAL

Norman H. Simpson, Fort Worth, and William D. Smith, Arlington, Tex., assignors to Consolidated Vultee Aircraft Corporation, San Diego, Calif., a corporation of Delaware Application March 21, 1950, Serial No. 150,882

6 Claims. (Cl. 117—68.5)

This invention relates to pressure-heat sensitive bonding material and more particularly to heat and pressure sensitive bonding adhesives in the form of tape or film.

An object of the present invention is to provide bonding adhesives in tape physical form adapted under the application of heat and pressure to effect a high strength bond between materials to be joined.

Another object of this invention is the provision of a novel form of adhesive tape which is especially adapted for joining metals having particularly low fatigue resistance.

Another object of the invention resides in the provision of a composite, adhesive tape characterized by its high elasticity and effectiveness in damping vibrations comprising laminae of heat sensitive, low pressure and high pressure thermosetting synthetic resin adhesive compositions overlaying a central base of a flexible porous material.

Another object of the invention lies in providing a laminar, adhesive tape embodying inner laminae of low pressure, thermosetting adhesive composition and exterior laminae of high pressure, thermosetting adhesive composition, which laminae are supported on a flexible central supporting member of fibrous material which resists the formation of gas pockets in the curing operation.

A further object is to provide as a new article of manufacture an adhesive tape particularly adapted for bonding metal to metal and is formed of a flexible material coated by two types of thermosetting adhesive compositions, which adhesive compositions and flexible material effect a unitary structure, which does not disintegrate into its individual components, and which is further characterized by its ease and economy of manufacture.

Other objects and features of the present invention will be readily apparent to those skilled in the art from the following specification and appended drawings wherein is illustrated a preferred form of the invention, and in which:

Figure 1 is a diagrammatic view of the tape of the present invention showing the components thereof.

Figure 2 is an enlarged diagrammatic cross section of the tape.

Having reference now in detail to the drawings there is shown a tape indicated generally by the numeral 10 composed in accordance with the present invention. Tape 10 comprises a central base 11 of flexible, fibrous cloth material, an intermediate coating 12 of a low pressure, heat sensitive, thermosetting synthetic resin adhesive composition applied to and overlaying the central base 11 to effect adhesive laminae 13 and 14, and an exterior coating 15 of a high pressure, heat sensitive, thermosetting synthetic resin adhesive composition disposed upon both sides of the intermediate coating 12 to provide adhesive laminae 16 and 17.

The flexible, fibrous material 11 employed in the preferred embodiment of the invention as a base or vehicle to support the adhesive compositions 12 and 13 is a nylon cloth, the thickness of which should not exceed .004". This invention also contemplates, as a preferred material, the use of fibrous glass cloth as a base in the fabrication of the tape, the thickness of which also is not to exceed .004". The present invention intends the use of tape carriers which are characterized by the quality of being laterally pervious. It is to be understood that nylon cloth and fibrous glass cloth are but preferred examples of suitable carriers. By utilizing a base which affords lateral passage it is believed that there is less likelihood of gas pockets forming in the cured bond, the fill and warp of the cloth providing channels in which gas collects to be forced out by the flow of the low pressure adhesive during the curing operation.

In the manufacture of the adhesive tape a low pressure thermosetting adhesive is applied first to the fibrous material. This adhesive is applied from solution in a suitable manner, such as by brushing, dipping, roller coating, spraying and the like.

A preferred low pressure thermosetting synthetic resin adhesive composition comprises or consists of a synthetic linear polyamide combined with a compatible phenol formaldehyde resin. The polyamides that may be used are of the alcohol soluble type described in United States Patent 2,130,948. Alcohol soluble polyamides are those which are prepared from diamines and dicarboxylic acids, one or both of which contain a hydrocarbon substituent in the chain of atoms separating the amide-forming groups. As an example there is the polyamide derived from hexamethylenediamine and beta-methyl adipic acid. Polymers derived from a mixture of polyamide-forming reactants afford another suitable class of polyamides. An example of such an interpolymer or copolymer is the polyamide derived from a mixture of diamines with one or more dicarboxylic acids. Thus the interpolyamide derived from equimolecular amounts of hexamethylene diammonium sebacate is contemplated for use.

The phenol-formaldehyde resin employed is alcohol soluble and in the A-stage. Preferably the resin is a condensation product condensed in the molecular ratio of from 1 mol of phenol to .7 to 3 mols formaldehyde made either with an acid or basic catalyst and neutralized in a manner well known in the art.

The synthetic linear polyamide and the phenol-formaldehyde resin are combined in a volatile alcohol such as ethyl alcohol. The quantity of synthetic linear polyamide in the adhesive composition may range between 66⅔% to 20% by weight and the phenol-formaldehyde may range from 33⅓% to 80% by weight. For satisfactory compositions, the amount of solids content in the common alcohol solvent may range from 15% to 55% by weight. The composition is adapted to set under heat and pressure. The setting temperature may range from approximately 300° F. to 350° F. and is applied for 25 to 35 minutes. The pressure required to effect flow of the composition is very low; it has been found that a pressure of 2 p. s. i. may be employed. However, the preferred range lies between 7.5 to 100 p. s. i.

After the low pressure adhesive coating has been applied the tape is passed through a drying medium to evaporate the solvent in the adhesive. When this solvent has been driven off the tape is then coated with a high pressure thermosetting adhesive composition, and again in any well-known manner, such as by dipping, spraying, brushing, flowing, or roller coating. The initial adhesive coating penetrates into the interstices between the fibers and bridges over to provide a foundation to which the high pressure thermosetting adhesive is adhesively united.

The high pressure thermosetting adhesive composition comprises a synthetic rubber combined with phenol formaldehyde synthetic resin. The preferred synthetic rubber is neoprene, a plastic polymer of chloroprene, and may be prepared by polymerizing chloroprene as set out in United States Patent 1,950,436. Chloroprene is chloro-2-butadiene-1:3. The preparation of this liquid is described in the Journal of the American Chemical Society, volume 53, page 4203(1931).

Synthetic rubber compounds commercially known as "Chemigum" and "Hycar" may be employed in place of the chloroprene polymer and mixed and worked with the phenol formaldehyde to provide a homogenous mass. "Chemigum" and "Hycar" are butadiene acrylic nitrile type copolymers.

As in the low pressure thermosetting adhesive composition the phenol formaldehyde resin utilized is preferably an A-stage alcohol soluble phenol formaldehyde condensation product condensed in the molecular ratio of from 1 mol of phenol to .7 to 3 mols of formaldehyde made either with an acid or basic catalyst and neutralized in well known manner.

The proportions of the constituents comprising the high pressure thermosetting adhesive composition may vary from, by weight, 20 to 50 parts of A-stage phenol formaldehyde resin to 100 parts of the synthetic rubber compound.

The mixture of the synthetic rubber compound and the A-stage phenol formaldehyde resin are given a desired consistency by dissolving the mixture in a suitable solvent which has a high rate of evaporation but which still permits ready spreading. The solvent used is one having a boiling point in the range of from about 180° to 230° F. A suitable solvent is toluene. The ratio of the total solids to solvent may be varied, for instance, from about 6% to 10% solids to 94% to 90% solvent.

This adhesive is cured or set by subjecting it to heat and pressure. The curing temperature may be in the range of between 300° F. and 350° F. and heat is applied usually for a period of 25 to 35 minutes. When used alone to bond materials a pressure of at least 100 lbs. p. s. i. is required to insure flow of the adhesive to fill minute imperfections in the surfaces being joined.

After the addition of the high pressure thermosetting adhesive coating to the surfaces of the low pressure thermosetting adhesive coating the tape is again subjected to a drying treatment to evaporate the solvent from the high pressure coating. After the solvent has been evaporated the tape is then ready for use.

By utilizing a thermosetting adhesive, of the character described, for the outer laminae of the tape a bond will be provided, between the articles to be joined, which is particularly effective in damping vibrations and which results in a construction that is highly fatigue resistant. The synthetic rubber component of the outer adhesive provides elasticity and the desired vibration damping characteristic. The phenolic in the adhesive serves to adhere the synthetic rubber to the surfaces to be joined, and additionally increases the hysteretic characteristic of the synthetic rubber whereby it increases its capacity to absorb vibration.

The phenolic modified synthetic linear polyamide adhesive is provided principally to permit the use of lower curing pressures. It serves to eliminate stress concentrations in that it has the ability to flow readily into crevices and depressions in faying surfaces under the application of relatively low pressures. Since stress concentrations are avoided the adhesive of the inner laminae thus serves to increase the strength of the joint in that it effects a more uniform bond.

With a tape having the characteristics described a wider field is afforded as to the type of materials that may be bonded. While nonmetallic materials can be joined the present invention is especially adapted for bonding metal to metal. Since it has great capacity for absorbing vibration it is ideally suited for use with metals having particularly low fatigue resistance. Metals, and their alloys, such as aluminum, magnesium, and steel, whose fatigue resistance is low, are examples of materials which are particularly benefited.

For ease in manufacturing the tape of the present invention, the fibrous glass or nylon cloth may be employed in sheet form which is of sufficiently large width to permit its being readily handled; cloths in widths of one to three feet have been found satisfactory. After the low pressure and high pressure thermosetting adhesives have been applied to this sheet and the solvents thereof driven off the relatively large resulting article is then cut into strips of desired widths.

The following example illustrates in greater detail the method of producing a tape of this invention:

A tape was prepared by utilizing as a base a strip of nylon cloth (AN-C-127) having a thickness of .004". This strip was first dipped in a low pressure thermosetting adhesive composition comprising a solution of, by weight, 10% of a polyamide interpolymer derived from equimolecular amounts of hexamethylene diammonium adipate (hexamethylenediamine - adipic acid salt) and decamethylene diammonium sebacate, 16% of A-stage phenol formaldehyde resin, and 74% of ethyl alcohol. After this dipping operation the strip is passed at the rate of one foot per minute through a drying chamber held at a temperature of 210° F. to evaporate the solvent, ethyl alcohol. A laminate of low pressure thermosetting adhesive is thereby deposited on either surface of the strip. The minimum thickness of each laminate effected is preferred to be no less than .0025", and the maximum thickness no more than .005". The total thickness of fabric strip plus the two laminae therefore ranges from .009" to .014", after evaporation of the solvent.

The nylon fabric with its first coating is next dipped into a solution of high pressure thermosetting adhesive comprising, by weight, 100 parts of neoprene and 40 parts of A-stage phenol formaldehyde resin, with sufficient toluene added to provide an adhesive of 8% solids content. The strip, after this second coating operation, is returned to the drying chamber and passed therethrough again at the rate of one foot per minute to evaporate the solvent and deposit a high pressure thermosetting adhesive lamina upon each of the lamina provided by the first dipping. These exterior laminae should be within the thickness range of .002" to .005" after the drying operation.

In like manner a tape was formed substituting fibrous glass cloth (ECC-11 A-113) for the nylon cloth.

It is to be understood that the above detailed description is illustratively merely of a practical method of applying this invention.

As was hereinbefore stated the present invention requires that the thickness of the base material and the adhesive laminae be limited. The thickness of the base material is not to exceed .004", the low pressure thermosetting adhesive should be not less than .0025" and no more than .005", and the high pressure thermosetting adhesive should be .002" to .005" in thickness. By limiting the thicknesses of the components of the tape to the values enumerated higher bond strengths are obtained than would be the case with thicker tapes. With thick tapes shearing forces will cause the granular structure of the adhesives and the fibers of the base to tend to flow in the direction of the shear pull thereby creating a tendency for the elements of the tape itself to develop from shear to tension stresses. With a thin glue line between the parts being joined the tendency to develop such tension is much less pronounced and therefore forms bonds of greater shear strength.

The improved form of tape herein provided achieves a superior bonding result and is particularly adapted for use in joining metal to metal when high strength joints are desired. It affords an economical means of applying the bonding medium to the parts being joined involving less expenditure of time and labor. Because of the employment of low pressure thermosetting adhesive laminae in the tape of this invention the bonding of one surface to another can be accomplished utilizing only low pressures. It has been found that the amount of pressure required in the curing operation is only that which is necessary to cause flow of the low pressure thermosetting adhesive. Utilizing this invention's tape substantially reduces the possibility of the formation of minute gas pockets in the bond, which gas pockets are all too frequently found in bonds effected by use of viscous adhesive compounds. Gas pockets have an adverse effect on the strength of a bond since they reduce the contact area of the adhesive. The filaments or fibers constituting the base material of this invention serve as a path or flow channel through which occluded gases are liberated. The gases form from either the solvents or from the chemical action of polymerization and will readily escape under low bonding pressures during the curing operation. If cement should be covering the edges of the tape, it would be in a plastic state during the curing operation, by reason of the applied heat, and the gases would readily bubble out. Since gases can escape there obviously is less tendency for gas pockets to form or blowing to occur in the bonded joint. As a result, much lower pressures can be successfully used in establishing a bond. Further, much larger areas can be bonded without blistering or blowing than is possible with tapes which do not utilize a base fabric affording lateral escape passages for formed gases. A tape adhesive of the character herein disclosed therefore will form a tighter and more integrated bond between the materials to which it is applied.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What is claimed is:

1. A new article of manufacture for bonding metal to metal comprising a flexible woven, laterally pervious, body of fibrous material selected from the group consisting of nylon and glass fiber, a first coating of low pressure, heat curable thermosetting adhesive integrally secured to said body, said thermosetting adhesive comprising the product of a mixture of 66⅔% to 20% by weight of an alcohol soluble synthetic linear polyamide and 33⅓% to 80% by weight of a compatible heat-hardenable phenol formaldehyde resin, and a coating of a high pressure, heat curable thermosetting adhesive adhered to said first adhesive coating, said second thermosetting adhesive comprising the product of a mixture of 20 to 50 parts, by weight, of a heat hardenable phenol formaldehyde resin and 100 parts, by weight, of a synthetic rubber selected from the group consisting of chloroprene polymers and butadiene acrylic nitrile copolymers.

2. A flexible metal bonding tape comprising a laterally pervious base formed of fibrous material selected from the group consisting of nylon and glass fibers, a first coating of a low pressure, heat curable thermosetting adhesive integrally secured to said base, said thermosetting adhesive comprising 66⅔% to 20% by weight, of an alcohol soluble synthetic polyamide, derived from a mixture of diamines and dicarboxylic acids, and 33⅓% to 80% by weight, of a heat-hardenable resin compatible with the polyamide and obtained by reacting phenol with formaldehyde in the ratio of 1 mol phenol to at least 0.7 mol formaldehyde, and a coating of a high pressure, heat curable thermosetting adhesive adhered to said first coating, said second thermosetting adhesive comprising 20 to 50 parts, by weight, of a heat-hardenable resin, obtained by reacting phenol with formaldehyde in the ratio of 1 mol phenol to at least 0.7 mol formaldehyde, and 100 parts, by weight, of a synthetic rubber selected from a group consisting of a chloroprene polymer and a butadiene acrylic nitrile copolymer.

3. A flexible tape for bonding metal comprising a base of woven, laterally pervious, nylon cloth, a first coating of a low pressure, heat curable thermosetting adhesive integrally secured to said base, said thermosetting adhesive comprising 66⅔% to 20%, by weight, of an alcohol soluble synthetic polyamide, derived from a mixture of diamines and dicarboxylic acids, and 33⅓% to 80%, by weight, of a heat-hardenable resin compatible with the polyamide and obtained by reacting phenol with formaldehyde in the ratio of 1 mol phenol to at least 0.7 mol formaldehyde, and a coating of a high pressure, heat curable thermosetting adhesive adhered to said first coating, said second thermosetting adhesive comprising 20 to 50 parts, by weight, of a heat-hardenable resin, obtained by reacting phenol with formaldehyde in the ratio of 1 mol phenol to at least 0.7 mol formaldhyde, and 100 parts, by weight, of a synthetic rubber selected from a group consisting of a chloroprene polymer and a butadiene acrylic nitrile copolymer.

4. A laminated metal bonding tape comprising a flexible woven, laterally pervious, body of fibrous material selected from the group consisting of nylon and glass fibers having a thickness of not more than .004 of an inch, a lamina, having a thickness of between .0025 of an inch and .005 of an inch, of low pressure, heat curable thermosetting adhesive integrally secured to the front and back faces of said body, said thermosetting adhesive comprising 66⅔% to 20%, by weight, of an alcohol soluble synthetic linear polyamide and 33⅓% to 80%, by weight, of a heat-hardenable resin compatible with the polyamide and obtained by reacting phenol with formaldehyde in the ratio of 1 mol phenol to at least 0.7 mol formaldehyde, and a lamina, having a thickness of between .002 of an inch and .005 of an inch, of a high pressure, heat curable thermosetting adhesive adhered to each of said laminae of said first adhesive, said second thermosetting adhesive comprising the product of a mixture of 20 to 50 parts, by weight, of a heat-hardenable resin, obtained by reacting phenol with formaldehyde in the ratio of 1 mol phenol to at least 0.7 mol formaldehyde, and 100 parts, by weight, of a synthetic rubber selected from the group consisting of chloroprene polymers and butadiene acrylic nitrile copolymers.

5. A flexible tape for bonding metal comprising a base of woven, laterally pervious, nylon cloth having a thickness of not more than .004 of an inch, a lamina, having a thickness of between .0025 of an inch and .005 of an inch, of low pressure, heat curable thermosetting adhesive integrally secured to the front and back faces of said body, said thermosetting adhesive comprising 66⅔% to 20%, by weight, of an alcohol soluble synthetic linear polyamide and 33⅓% to 80%, by weight, of a heat-hardenable resin compatible with the polyamide and obtained by reacting phenol with formaldehyde in the ratio of 1 mol phenol to at least 0.7 mol formaldehyde, and a lamina, having a thickness of between .002 of an inch and .005 of an inch, of a pressure, heat curable thermosetting adhesive adhered to each of said laminae of said first adhesive, said second thermosetting adhesive comprising the product of a mixture of 20 to 50 parts, by weight, of a heat-hardenable resin, obtained by reacting phenol with formaldehyde in the ratio of 1 mol phenol to at least 0.7 mol formaldehyde, and 100 parts, by weight, of a synthetic rubber selected from the group consisting of chloroprene polymers and butadiene acrylic nitrile copolymers.

6. A laminated metal bonding tape comprising a flexible woven, laterally pervious, body of fibrous material selected from the group consisting of nylon and glass fibers having a thickness of not more than .004 of an inch, a lamina, having a thickness of between .0025 of an inch and .005 of an inch, of low pressure, heat curable thermosetting adhesive integrally secured to the front and back faces of said body, said thermosetting adhesive comprising the product of drying in place a solution of, by weight, 10% of an alcohol soluble synthetic linear polyamide derived from equimolecular amounts of hexamethylene diammonium adipate and decamethylene diammonium sebacate, 16% of A-stage phenol formaldehyde resin and 74% of ethyl alcohol, resin, and a lamina, having a thickness of between .002 of an inch and .005 of an inch, of a high pressure, heat curable thermosetting adhesive adhered to each of said laminae of said first adhesive, said second thermosetting adhesive comprising the product of drying in place an 8% solids content solution comprising 100 parts, by weight, of a chloroprene polymer, 40 parts, by weight, of A-stage phenol formaldehyde resin, and toluene.

NORMAN H. SIMPSON.
WILLIAM D. SMITH.

REFERENCES CITED

The following references are of record in the file of this patent:

UNITED STATES PATENTS

| Number | Name | Date |
|---|---|---|
| 2,322,779 | Gocher et al. | June 29, 1943 |
| 2,358,831 | Schieman | Sept. 26, 1944 |
| 2,405,038 | Jennings | July 30, 1946 |
| 2,414,125 | Rheinfrank | Jan. 14, 1947 |
| 2,420,366 | Green | May 13, 1947 |
| 2,440,965 | Merrill | May 4, 1948 |
| 2,499,724 | Compton | Mar. 7, 1950 |